UNITED STATES PATENT OFFICE.

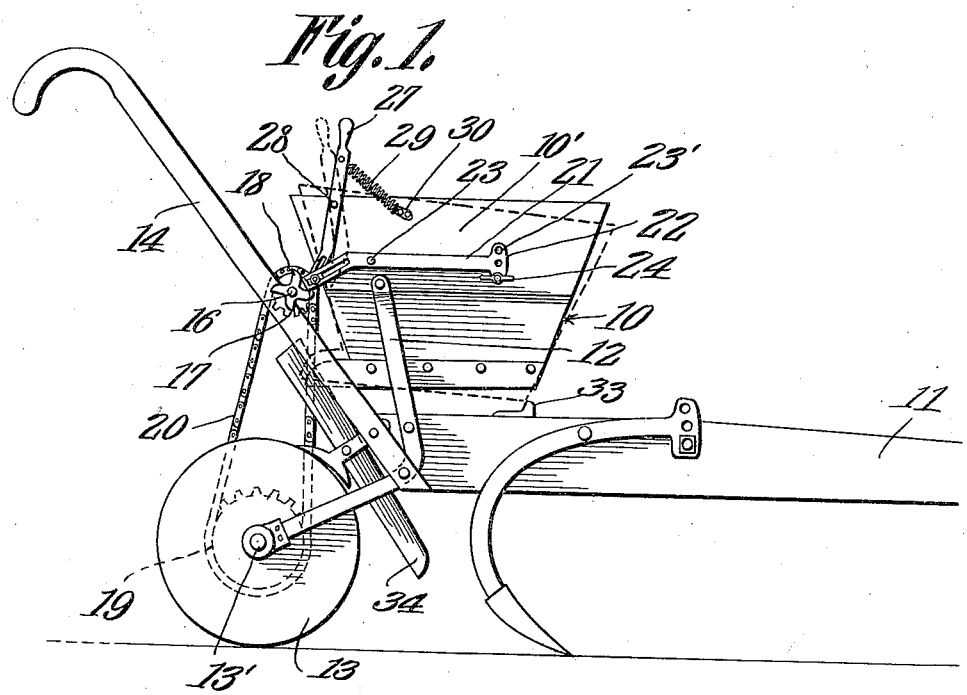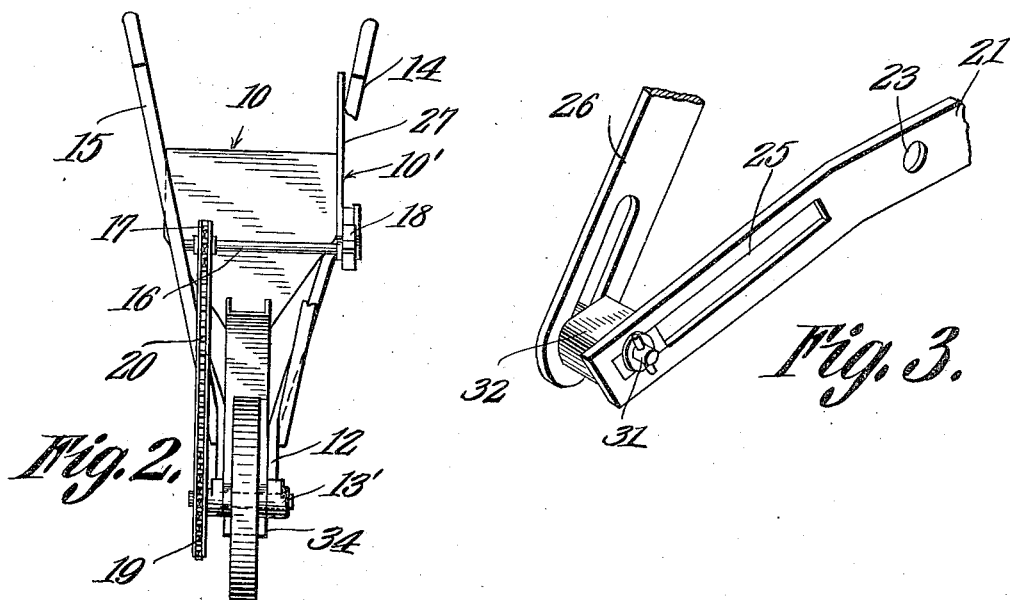

BERTIE SAWYER, OF EMPIRE, GEORGIA.

PLANTER.

1,004,692. Specification of Letters Patent. Patented Oct. 3, 1911.

Application filed June 6, 1911. Serial No. 631,508.

*To all whom it may concern:*

Be it known that I, BERTIE SAWYER, a citizen of the United States, residing at Empire, in the county of Dodge and State of Georgia, have invented a new and useful Planter, of which the following is a specification.

This invention relates to an improvement in distributing devices which may be used to distribute seed or fertilizer.

The primary object of said invention is to provide a simple and efficient mechanism actuated by the covering wheel, for vibrating the distributing hopper.

A further object of the invention is to provide means for throwing the hopper vibrating mechanism out of gear without moving said hopper relative to its support.

In the drawings:—Figure 1 is a side elevation of a fertilizer distributer equipped with the improved driving mechanism. Fig. 2 is a rear elevation, and Fig. 3 is a detail view of the lever and block by means of which the distributing mechanism is brought into and out of gear.

In the drawings 10 designates a vibrating hopper which is pivotally supported above the centrally disposed beam 11, said hopper being supported by a plurality of L-shaped arms 12 which are secured to the beam 11 and which support a covering wheel 13, disposed to the rear of the hopper 10. Secured to the beam 11 are a plurality of handles 14 and 15 which are of the usual construction, and which support, at a point intermediate their ends a shaft 16 on which is mounted a sprocket wheel 17, said sprocket wheel being disposed between the handles. Arranged on the end of said shaft and beyond the handle 14 is a star wheel 18 which is so disposed as to be in alinement with the side walls 10' of the hopper. The shaft 13' which supports the coverer wheel 13 is provided with a sprocket 19 a chain 20 passing over said sprocket 19 and the sprocket 17 which is mounted on the shaft 16. It will be noted by this construction that as the distributer travels over the ground, the shaft 16 will be rotated by means of the chain 17. Secured to the walls 10' of the hopper is a curved lever 21 which terminates in a plate 22, this lever being permanently secured to the hopper at the point 23, a set screw 24 passing through the openings 23' in the plate 22 in order to secure an angular adjustment of the hopper vibrating mechanism. The end portion of the lever 21 is provided with an elongated slot 25 and extending parallel with the offset end of the lever 21 is the offset end 26 of a second lever 27 which is pivotally connected at the point 28 to the hopper and which is normally held in the position shown in Fig. 1 by means of the coiled spring 29, one end of which is secured to said lever and the other to the securing device 30 which is secured to the hopper. Arranged on the end portion 26 of the lever 27 is a pin 31 which extends within the elongated slot formed in the end portion of the lever 21 and secured to said pin beyond said lever 21 is a block 32 which is capable of movement out of and into the path of travel of the star wheel 18, the movement of said block being regulated by the lever 27 and its position relative to said star wheel independent of the movement of the lever 27 being regulated by adjusting the end portion of the lever 21, this adjustment regulating the contact of said star wheel with the block thus regulating the degree of movement of the hopper 10.

It will be noted that as the shaft 16 is rotated and movement imparted to the star wheel 18, said star wheel will contact with the block 32 thus moving the hopper 10 on its pivot, the forward end of the hopper normally resting on a support 33 arranged on the beam 11, the material which passes from the hopper during its vibration falling into the delivering chute 34 which is arranged immediately in advance of the covering wheel 13. When it is desired to propel the machine without operating the distributing mechanism, lever 27 is swung to the position shown in dotted lines in Fig. 1, block 32 thus being brought out of the path of the star wheel 18, the hopper 10 resting, as shown in dotted lines on the beam 11. When it is desired to throw the hopper vibrating mechanism into gear the block is slid by means of the lever 27 into the path of the star wheel 18, the normal tendency of the spring which connects the lever 27 with the hopper being to hold said block in this position.

The many advantages of a driving mechanism of this character will be clearly apparent as it will be noted that the feeding of the material contained within the hopper 10 may be accurately controlled and regulated, attention being called to the fact that the entire driving mechanism may be economically manufactured and the various parts readily assembled.

What is claimed is:—

In a fertilizer distributer, a pivotally supported hopper, a lever pivotally supported by said hopper, means for holding said lever against movement independent of said hopper, means for adjusting said lever relative to said hopper said lever being provided with an off-set end, said off-set end being formed with an elongated slot, a pin mounted for movement within said slot, a block arranged on said pin, a second lever pivotally supported by said hopper, a coiled spring, one end of said spring being secured to said lever, its other end being secured to said hopper, said second lever being formed with an off-set end arranged to lie parallel with the off-set end of the first mentioned lever, said lever receiving one of the ends of said pin.

In testimony that I claim the foregoing as my own, I have hereto affixed my signature in the presence of two witnesses.

BERTIE SAWYER.

Witnesses:
J. A. NEESE,
JNO. L. CRAVEY.

---

Copies of this patent may be obtained for five cents each, by addressing the "Commissioner of Patents, Washington, D. C."